US010019771B2

(12) United States Patent
Ahmed et al.

(10) Patent No.: US 10,019,771 B2
(45) Date of Patent: Jul. 10, 2018

(54) METHOD AND SYSTEM FOR ENABLING AFTER-HOURS VEHICLE PICK UP

(71) Applicant: GENERAL MOTORS LLC, Detroit, MI (US)

(72) Inventors: Wahaj Ahmed, Dearborn, MI (US); Steven S. Sauerbrey, Farmington Hills, MI (US); Huong T. Chim, Troy, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 1170 days.

(21) Appl. No.: 14/062,421

(22) Filed: Oct. 24, 2013

(65) Prior Publication Data

US 2015/0120402 A1  Apr. 30, 2015

(51) Int. Cl.
G06Q 50/30 (2012.01)
G06Q 30/06 (2012.01)

(52) U.S. Cl.
CPC ............. *G06Q 50/30* (2013.01); *G06Q 30/06* (2013.01)

(58) Field of Classification Search
CPC .............................. G06Q 50/30; G06Q 30/06
USPC ........................................................ 705/13
See application file for complete search history.

(56) References Cited

U.S. PATENT DOCUMENTS

| 7,088,219 | B2 | 8/2006 | Dawson et al. | |
| 8,421,590 | B2 | 4/2013 | Taki et al. | |
| 9,894,483 | B2* | 2/2018 | Kokkonen | H04W 4/30 |
| 2002/0035521 | A1* | 3/2002 | Powers | G06Q 10/02 705/28 |
| 2002/0186144 | A1* | 12/2002 | Meunier | G07B 15/00 340/4.6 |
| 2003/0222760 | A1* | 12/2003 | Hara | G07F 5/26 340/5.73 |
| 2007/0136083 | A1* | 6/2007 | Simon | B60R 25/04 701/36 |

(Continued)

OTHER PUBLICATIONS

Strohm, Chris, "Dropping off and Picking up" (Mar. 26, 2009); ArtsAutomotive.com, https://web.archive.org/web/20111123204953/http://artsautomotive.com/publications/5-shop/149-dropping-off-and-picking-up/ (Year: 2009).*

*Primary Examiner* — Michael P Harrington
*Assistant Examiner* — Bryan J Kirk
(74) *Attorney, Agent, or Firm* — Harness, Dickey & Pierce, P.L.C.

(57) ABSTRACT

In an example of a method for enabling after-hours vehicle pick up, a server recognizes that a service payment request is outstanding for a serviced vehicle. In response to the recognizing, the server transmits an ignition block command to the serviced vehicle. The ignition block command triggers a powertrain control module of the serviced vehicle to enter a disengaged state that electrically prohibits the powertrain control module from providing tractive power to a vehicle drive wheel. At the server, a notification of a payment acceptance is received from an infotainment unit of the serviced vehicle or a mobile communications device associated with the serviced vehicle. In response to receiving the notification, the server transmits an ignition enabling command triggering the powertrain control module to enter an engaged state that electrically enables the powertrain control module to provide tractive power to the vehicle drive wheel.

14 Claims, 2 Drawing Sheets

(56) References Cited

U.S. PATENT DOCUMENTS

| | | | |
|---|---|---|---|
| 2009/0286559 A1* | 11/2009 | Janas | G06Q 30/02 |
| | | | 455/466 |
| 2010/0155471 A1* | 6/2010 | Heinz | G07C 9/00103 |
| | | | 235/381 |
| 2013/0040620 A1 | 2/2013 | Van Wiemeersch et al. | |
| 2013/0325521 A1* | 12/2013 | Jameel | G06Q 10/02 |
| | | | 705/5 |
| 2013/0329888 A1* | 12/2013 | Alrabady | G06Q 20/3224 |
| | | | 380/270 |
| 2014/0278608 A1* | 9/2014 | Johnson | B60R 25/24 |
| | | | 705/5 |
| 2014/0343755 A1* | 11/2014 | Rasal | B60R 25/209 |
| | | | 701/2 |
| 2015/0058224 A1* | 2/2015 | Gaddam | G06Q 20/327 |
| | | | 705/44 |

\* cited by examiner

METHOD AND SYSTEM FOR ENABLING AFTER-HOURS VEHICLE PICK UP

BACKGROUND

Technical Field

The present disclosure relates generally to a method and a system for enabling after-hours vehicle pick up.

Background

Vehicles often have wireless remotes that are used for controlling various vehicle functions, such as locking and unlocking doors, remotely starting the vehicle engine, and/or turning on vehicle lights. Traditional vehicle dedicated remote controls are referred to as key-fobs. More recently, applications for mobile communications devices have been developed so that the mobile communications device can function as the vehicle dedicated remote control.

SUMMARY

Disclosed herein are examples of a method for enabling after-hours vehicle pick up and of a method for picking up a serviced vehicle after hours. In an example of the method for enabling after-hours vehicle pick up, a server recognizes that a service payment request is outstanding for a serviced vehicle. In response to the recognizing, the server transmits an ignition block command to the serviced vehicle. The ignition block command triggers a powertrain control module of the serviced vehicle to enter a disengaged state that electrically prohibits the powertrain control module from providing tractive power to a vehicle drive wheel. At the server, a notification of a payment acceptance is received from an infotainment unit of the serviced vehicle or a mobile communications device associated with the serviced vehicle. In response to receiving the notification, the server transmits an ignition enabling command triggering the powertrain control module to enter an engaged state that electrically enables the powertrain control module to provide tractive power to the vehicle drive wheel. Also disclosed herein is a system for enabling after-hours vehicle pick up.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the system and method disclosed herein enable a vehicle owner, or other authorized vehicle user, to pick up his/her vehicle from an establishment that has serviced the vehicle, either before or after the establishment's normal hours of operation. The examples disclosed herein include and utilize an in-vehicle powertrain control module that is operatively coupled to a server of an in-vehicle infotainment unit service provider. The powertrain control module has a disengaged state, in which it is electrically inhibited from providing tractive power to one or more vehicle drive wheels. The disengaged state may be entered in response to an ignition block command that is sent to the vehicle from the server. The ignition block command may be sent remotely from the server i) when the vehicle is due to be picked up from the establishment while the establishment is closed (i.e., after-hours) and ii) when payment is due to the establishment for the service performed on the vehicle. The server can remotely command the powertrain control module to subsequently exit the disengaged state, for example, in response to receipt of a payment notification for the service. As such, the system and method disclosed herein enable a secure after-hours vehicle pick up from the establishment while also ensuring that the establishment receives payment before the vehicle is released.

It is to be understood that, as used herein, the term "user" includes a vehicle owner or another authorized driver of the vehicle. The user is generally a customer of the establishment and also a customer of an infotainment unit service provider that operates the server that communicates with the vehicle components.

The term "communication" is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Figure 1:
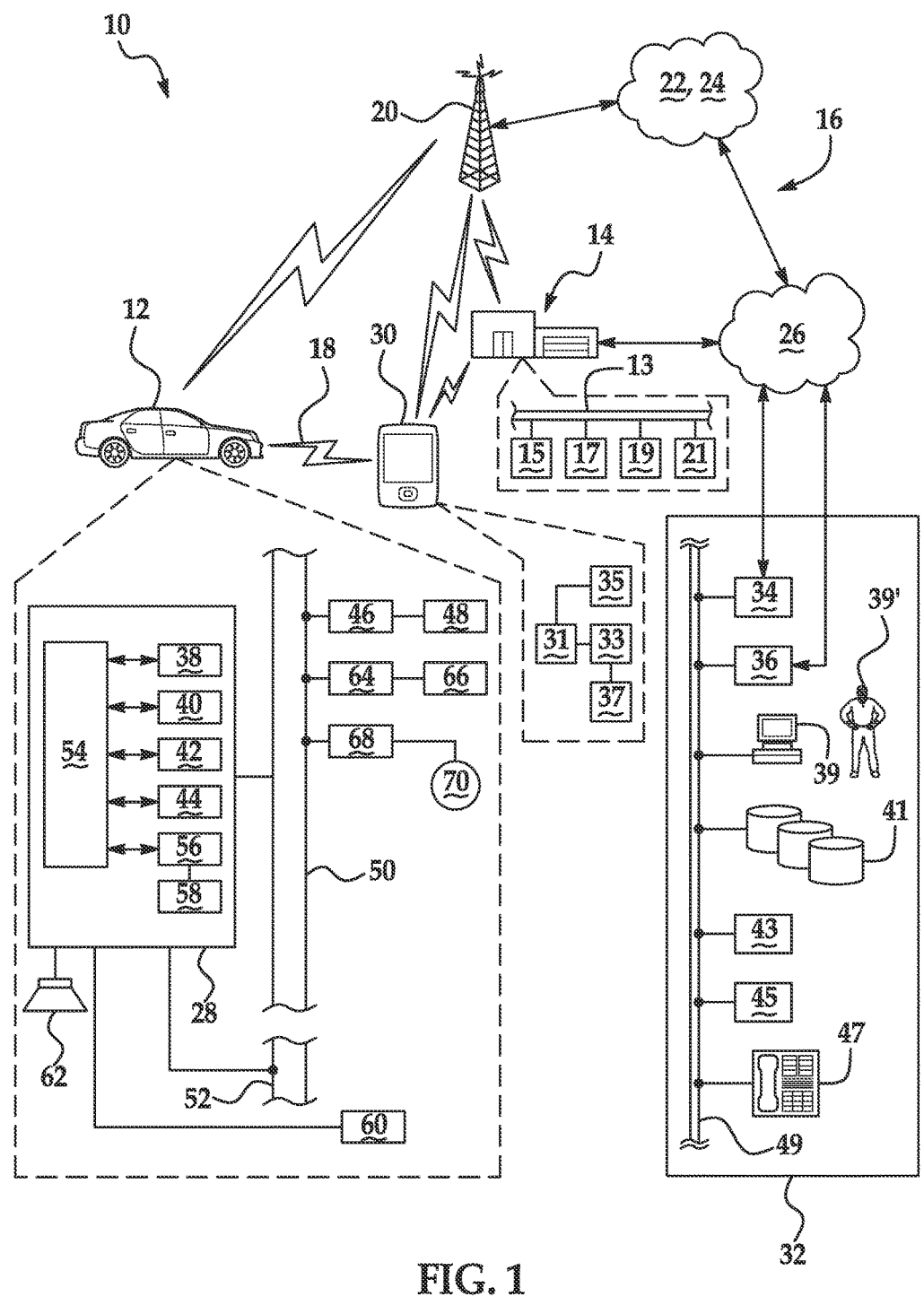
FIG. 1 is a schematic view of an example of a system for enabling after-hours vehicle pick up.

FIG. 1 depicts an example of a system 10 for enabling after-hours pick up of a serviced vehicle 12 from an establishment 14. The establishment 14 may be any business that services the vehicle 12 and has a system authorized to communicate with a server (e.g., 36) of the in-vehicle infotainment unit service provider. In an example, the establishment 14 is a dealership that has a service department. The service department may offer a variety of services to the vehicle 12, such as tire change, tire rotation, oil change, part repair/replacement, vehicle diagnostics and tune-up, detailing, collision repair, etc. Examples of other establishments 14 may include mechanic shops, oil change shops, tire retailers, etc.

The establishment 14 includes a computer network in order to store and retrieve customer and/or vehicle information, to set up appointments, to create and maintain sales and/or service records, to accept customer payments, and/or to perform any other computer-related tasks associated with running the establishment 14. As shown in FIG. 1, the computer network of the establishment 14 may include computer equipment, such as processor(s) 15, server(s) 17, database(s) 19 (e.g., for receiving and storing vehicle and customer data/information and appointment), communication module(s) 21, etc. that are operatively connected to an establishment bus 13 (similar to bus 50, discussed below).

The processor 15 may be a controller, a host processor, and/or a processor working in conjunction with a central processing unit (CPU) performing the function of a general-purpose processor. The processor 15 includes hardware components that are capable of running computer readable instructions/code, which are embodied on non-transitory, tangible computer readable media. In any of the examples disclosed herein, the computer readable media may include any one of many physical media such as, for example, electronic, magnetic, optical, electromagnetic, or semiconductor media. More specific examples of suitable computer readable media include hard drives, a random access memory (RAM), a read-only memory (ROM), an erasable programmable read-only memory (EPROM), or a portable CD, DVD, or flash drive.

The server 17 is a system of computer hardware (which may include the processor 15) and software (i.e., computer readable code/instructions). The hardware of the server 17 runs the computer readable instructions that enable the server 17 to notify a vehicle user that the requested service(s) have been performed on his/her vehicle 12, to receive a vehicle pick up time from the vehicle user, and to initiate the process for having the ignition block command sent to the vehicle 12.

The server 17 is configured to automatically generate a vehicle service completion notification in response to a trigger that indicates that the outstanding vehicle service has been completed. In an example, a dealership employee may trigger the vehicle service completion notification using an in-vehicle application 58 that is resident on a memory 56 of the vehicle infotainment unit 28. The application 58 may be configured to generate the vehicle service completion notification, and may also include a profile of the vehicle owner (including, e.g., VIN, email address, etc.) and a web service URL to the server 17. In another example, the trigger may be that the service record for the vehicle 12 (e.g., stored in the database 19) has been closed out or completed, for example, by a dealership employee. When a user sets up an appointment for a vehicle service, a new service record may be generated and marked with an open status. While the vehicle 12 is being serviced, the details of the service (e.g., what has been done, the vehicle response, parts used, etc.) may be logged into the service record. Once the service is complete, the service record may be marked with a closed or complete status. This status is recognizable by the server 17 and triggers the server 17 to generate the vehicle service completion notification. In another example, the trigger may be the selection of a vehicle service completion notification icon, dropdown menu option, etc. on a workstation of the dealership employee. The vehicle service completion notification icon/option may be part of the software used to create vehicle service records. After the vehicle 12 has been serviced, the dealership employee may click on the vehicle service completion notification icon/option, which will initiate the generation of the vehicle service completion notification by the server 17.

In response to the trigger, the server 17 will generate the vehicle service completion notification or notice. The vehicle service completion notification is a message that indicates that the vehicle 12 has been serviced and is ready for pick up from the establishment 14. The vehicle service completion notification may also provide options to the recipient of the message for scheduling a pick up time.

The vehicle service completion notification may be a text message, and email, or an audio message to be transmitted to a mobile communications device 30 associated with a user of the vehicle 12. The server 17 may be programmed to receive the information within the profile of the vehicle owner (including email address, mobile communications device number, etc.) from the application 58. At least some of this information can be used to transmit the notification. The server 17 may also be programmed to identify the user and his/her mobile communications device 30 from information in the service record. For example, when the closing of the service record is the trigger for generation of the service completion notification, the vehicle identification number (VIN) or the user name associated with that particular service record is extracted from the service record, and is used to query the database 19 for a profile linked to the VIN or user name. The profile includes vehicle information (e.g., year, make, model, etc.) as well as additional user information, including the mobile dialing number of the user's mobile communications device 30. The mobile dialing number may have been one provided as a contact for this particular service, or may be a default or primary contact number for the vehicle user. For another example, when the vehicle service completion notification icon/option is selected from the open service record, the vehicle identification number or the user name associated with that particular service record is extracted from the open service record, and is used to query the database 19 for the profile linked to the VIN or user name.

The server 17 retrieves the mobile dialing number of the user's mobile communications device 30 from the profile. In conjunction with the communications module 21, the server 17 transmits the vehicle service completion notification to the mobile communications device 30 using the mobile dialing number. If the profile lists multiple mobile dialing numbers, the server 17 may be programmed to attempt to contact any number that is marked as a primary number first, and then all other numbers sequentially until the transmission of the vehicle service completion notification is complete.

As noted above, the transmission of the vehicle service completion notification is accomplished through the communications module 21. In an example, the communications module 21 includes suitable communications equipment, such as switches, switchboards, etc., modems, TCP/IP supporting equipment, and/or the like, to enable the server 17 to establish a communication with, for example, the mobile communications device 30. The communications module 21 is also configured to enable the establishment 14 to establish a communication with a call center 32 (discussed further below).

The mobile communications device 30 may be a smart phone, such as a GSM/LTE phone or a GSM/CDMA/LTE phone. The mobile communications device 30 includes physical hardware (e.g., a micro-processor 31), computer readable instructions stored in a memory 33, and a wireless communications module 35.

The wireless communications module 35 includes at least a cellular chipset/component for voice communications and a wireless modem for data transmission. In addition to being capable of making cellular or satellite connections (over a wireless carrier/communication system 16, discussed below), the wireless communications module 35 may also include a short range wireless communication unit that is capable making short range wireless connections. The wireless communications module 35 may be used to transmit data (e.g., a user's vehicle pick up time, payment information, etc.) to the establishment server 17 or to a server 36 at the call center 32.

The micro-processor 31 of the mobile communications device 30 may be similar to processor 54, described below, and is capable of executing the computer readable instructions stored in the memory 33. In an example, at least some of the computer readable instructions of the mobile device application 37 provide an interface for the user to communicate with the establishment server 17. More particularly, the mobile device application 37 receives and displays or plays any messages from the establishment server 17 and enables the user to choose a vehicle pick up time that is transmitted back to the establishment server 17. The mobile device application 37 may also enable the user to input and save payment information (e.g., credit card name, number, expiration, security code, etc.) that will subsequently be used to pay for the vehicle services. In still another example, at least some of the computer readable instructions of the mobile device application 37 provide an interface for the user to communicate with the call center server 36. More particularly, the mobile device application 37 receives and displays or plays any messages (e.g., a service payment request) from the call center server 36 and enables the user to transmit an acceptance or denial of payment back to the call center server 36.

The mobile communications device 30 also has a unique identifying code (e.g., a wireless connection key) that is used to pair the device 30 with an infotainment unit 28 of the vehicle 12 (e.g., over short range wireless connection link 18). The mobile communications device 30 and the infotainment unit 28 are paired when the device 30 and unit 28 exchange unique identifying codes with each other. This enables the device 30 and unit 28 to communicate typically under a secured connection. As a more specific example, initial pairing may involve setting the mobile communications device 30 to a short range wireless discovery mode (such as by selecting, on the device 300, a discovery mode function as a menu option, icon, or the like). While in the discovery mode, other devices having a short range wireless communication unit (such as the infotainment unit 28) are allowed to detect the presence of the mobile communications device 30. When the infotainment unit 28 locates the mobile communications device 30, the mobile communications device 30 automatically provides the type of device it is (e.g., a cellular phone) and its short range wireless connection name. The mobile communications device 30 may then prompt the user to enter a security code/password, and then the unique identifying code of the mobile communications device 30 is sent to the infotainment unit 28. Upon receiving the unique identifying code, the infotainment unit 28 sends its own unique identifying code to the mobile communications device 30 to ultimately pair the two devices 30, 28 together.

Once the device 30 and unit 28 have been paired and whenever within short range wireless communication range of each other, the mobile communications device 30 can directly communicate with the infotainment unit 28. This communication may be desirable, for example, when some application (e.g., application 37) resident in the memory 33 is capable of transmitting a signal (in response to a user input) to unlock the vehicle 12. In other examples, the application 37 can communicate with the call center server 36, and the call center server 36 can transmit an unlock command to the vehicle 12.

As mentioned above, the mobile communications device user may select a vehicle pick up time using the application 37. The message received from the establishment server 17 may indicate that the vehicle 12 is ready for pick up and may ask the user to enter a date and time for vehicle pick up/retrieval. This information may be transmitted in a message back to the establishment server 17. Upon receiving the message, the server 17 is configured to log the vehicle retrieval date and time into the computer system of the establishment.

In one example, an employee at the establishment 14 recognizes that the scheduled pick up time is before or after the normal hours of operation (also referred to herein as "after hours" or "an after-hours pick up"), and transmits an ignition block request to the call center server 36, In this example, the ignition block request may be a verbal request made using the phone, or a data message request made using a dealer application stored on an in-vehicle memory 56 or on a tablet computer that is part of the establishment's computer equipment.

In another example, the server 17 may be programmed to run computer readable instructions that will compare the vehicle retrieval time to the normal hours of operation of the establishment 14. In making this comparison, the server 17 is able to determine whether the vehicle 12 will be retrieved during the normal hours of operation or after hours.

When the establishment server 17 recognizes that the vehicle 12 will be picked up during normal hours of operation, the establishment server 17 performs no additional tasks with regard to the particular vehicle service request. However, when the establishment server 17 recognizes that the vehicle 12 will be picked up after hours, the establishment server 17 may be programmed to run computer readable instructions that will generate the ignition block request and transmit the ignition block request to the call center server 36 using the communications module 21. In this example, the ignition block request may be a data message request that is generated by the server 17 running suitable computer readable instructions.

In any of the examples disclosed herein, the ignition block request includes a request for the call center server 36 to initiate a remote ignition block of the vehicle 12 associated with the scheduled after-hours pick up. The ignition block request may also indicate that a service payment is due for the service(s) rendered to the vehicle. Still further, the ignition block may include a date and time for the initiation of the remote ignition block, or the call center server 36 may be programmed to initiate the remote ignition block upon receipt of the ignition block request.

Phone calls and/or messages (e.g., the ignition block request) may be transmitted to, from, and/or between communication component(s) of the establishment 14, communication component(s) of the call center 32, the mobile communications device 30 and/or the vehicle 12 using the carrier/communication system 16. In an example, the carrier/communication system 16 is a two-way radio frequency (RF) communication system. The carrier/communication system 16 may include one or more cell towers 20. It is to be understood that the carrier/communication system 16 may also include one or more base stations and/or mobile switching centers (MSCs) 22 (e.g., for a 2G/3G network), one or more evolved Node Bs (eNodeB) and evolved packet cores (EPC) 24 (for a 4G (LTE) network), and/or one or more land networks 26. The carrier/communication system 16 may be part of a cellular radio environment or a satellite radio environment, which may include a variety of wireless network providers (which include mobile network operator(s), not shown), utilizing the same or a variety of radio access technologies. The architecture of the wireless carrier/communication system 16 may be GSM (global system for mobile telecommunications), CDMA2000, UMTS (universal mobile telecommunications system), LTE (long-term evolution), or some other available architecture.

In addition to the call center server 36 being able to receive the ignition block request from the establishment server 17, the call center server 36 is also capable of transmitting command signals to the vehicle 12 and receiving data, notifications, etc. from the vehicle 12. As noted above, the user of the vehicle 12 is a customer of the infotainment unit service provider that operates the call center 32 and the server 36, and thus the server 36 is in selective communication with the vehicle 12.

In general, the call center server 36 is a system of computer hardware and computer readable instructions that assist in enabling the after-hours vehicle pick up at the establishment 14. More specifically, in response to receiving the ignition block request, the call center server 36 generates an ignition block command that is sent to the vehicle bus 50 of the vehicle 12. As will be described in more detail below, the ignition block command triggers the powertrain control module 68 of the vehicle to enter the disengaged state. In a similar manner, in response to receiving a service payment acceptance (either from the infotainment unit 28 or the mobile communications device 30), the call center server 36 generates an ignition enabling command that is sent to the vehicle bus 50 of the vehicle 12. As will be described in more detail below, the ignition enabling command triggers the powertrain control module 68 of the vehicle 12 to enter the engaged state.

The call center server 36 may be configured to receive the notifications (e.g., a service payment acceptance) from the infotainment unit 28 or from the mobile communications device 30 in the form of packet data. In this example, a communications module 45 receives the packet data from the infotainment unit 28 or the mobile communications device 30, and the packet data may include, for instance, a payment acceptance notification and/or payment information. Upon receiving the packet data, the communications module 45 unpacketizes the data, and transmits the data to the server 36. The server 36 includes software (to be run by processor 43 or another processor associated with the server 36) that is capable of recognizing that the outstanding service payment has been authorized or made, and then transmitting the ignition enabling command in response thereto.

The server 38 also includes software (to be run by processor 43 or another processor associated with the server 36) that enables it to forward the payment acceptance notification and/or the payment information on to the establishment server 17. In response, the establishment server 17 may close out the outstanding invoice and/or create a message within the user's profile that payment has been authorized or received.

The call center processor 43, which is often used in conjunction with telecommunication and computer equipment 47, is generally equipped with suitable software and/or programs enabling the processor 43 (and call center server 36) to accomplish a variety of call center functions. Further, the various operations of the call center 32 may be carried out by one or more computers (e.g., computer equipment 47) programmed to carry out some of the tasks of the call center 32. The telecommunication and computer equipment 47 (including computers) may include a network of servers (including server 36) coupled to both locally stored and remote databases (e.g., database 41) of any information processed.

The call center 32 also includes switch(es) 34 and live and/or automated advisors 39, 39'. The switch 34 may be a private branch exchange (PBX) switch. The switch routes incoming signals so that voice transmissions are usually sent to either the live advisor 39 or the automated response system 39', and data transmissions are passed on to a modem or other piece of equipment (not shown) for demodulation and further signal processing. The modem preferably includes an encoder, as previously explained, and can be connected to various devices such as the server 36 and database 41.

The database(s) 41 may be designed to store vehicle record(s), subscriber profile records, subscriber behavioral patterns, or any other pertinent subscriber and/or vehicle information. In an example, the database(s) 41 may be configured to store the user profile, which may contain personal information of the subscriber (e.g., the subscriber's name, garage address, billing address, home phone number, cellular phone number, etc.), as well as payment information (e.g., credit card name, number, expiration, security code, etc.) to be used when a payment authorization/acceptance is received by the call center server 36. It is to be understood that the databases 41 may allow the call center 32 to function as a repository for data collected from the vehicle 12 and/or from the vehicle owner/driver. In some instances, another facility may function as a repository for collected data (e.g., a lab (not shown) associated with the call center 32 whose database(s) the server 36 can access).

As illustrated in FIG. 1, the various call center components are coupled to one another via a network connection or bus 49, such as one similar to the vehicle bus 50 described below in connection with the vehicle 12. In the examples disclosed herein, the call center 32 may be associated with an infotainment and/or telematics service provider that provides vehicle related services and/or vehicle communication related services to the vehicle 12.

It is to be appreciated that the call center 32 may be any central or remote facility, manned or unmanned, mobile or fixed, to or from which it is desirable to exchange voice and data communications. As such, the live advisor 39' may be physically present at the call center 32 or may be located remote from the call center 32 while communicating therethrough.

The call center 32 shown in FIG. 1 may also be virtualized and configured in a Cloud Computer, that is, in an Internet-based computing environment. For example, the computer equipment 47 may be accessed as a Cloud platform service, or PaaS (Platform as a Service), utilizing Cloud infrastructure rather than hosting computer equipment 47 at the call center 32. The database 41 and server 36 may also be virtualized as a Cloud resource. The Cloud infrastructure, known as IaaS (Infrastructure as a Service), typically utilizes a platform virtualization environment as a service, which may include components such as the processor 43, database 41, server 36, and computer equipment 47. In an example, the ignition disablement/enablement software and services disclosed herein may be performed in the Cloud via the SaaS (Software as a Service). Subscriber or establishment service requests (e.g., the ignition block request) may be acted upon by the automated advisor 39, which may be configured as a service present in the Cloud.

While not shown, the system 10 shown in FIG. 1 also includes a communications network provider, which generally owns and/or operates the carrier/communication system 16. The communications network provider includes a mobile network operator that monitors and maintains the operation of the communications network. The network operator directs and routes calls, and troubleshoots hardware (cables, routers, network switches, hubs, network adaptors, etc.), software, and transmission problems. It is to be understood that, although the communications network provider may have back-end equipment, employees, etc. located at the call center 32, the call center 32 is a separate and distinct entity from the network provider. In another example, the equipment, employees, etc. of the communications network provider are located remote from the call center 32. The communications network provider provides the user with telephone and/or Internet services, while the call center 32 provides a variety of telematics-related services (such as, for example, those discussed hereinabove). The communications network provider may interact with the call center 32 to provide services (such as emergency services) to the user.

The serviced vehicle 12 is a vehicle, such as a car, motorcycle, truck, or recreational vehicle (RV), and is equipped with suitable hardware and computer readable instructions/code that enable it to communicate (e.g., transmit and/or receive voice and data communications) over the carrier/communication system 16 and/or using the short range wireless communication link 18.

Some vehicle communications (e.g., between the vehicle 12 and call center server 36 or the switch 34 at the call center 32) utilize radio transmissions to establish a voice channel with the carrier/communication system 16 such that both voice and data transmissions may be sent and received over the voice channel. In some instances, vehicle communications are enabled through the infotainment unit 28 via a cellular chipset/component 38 for voice communications and a wireless modem 40 for data transmission. In order to enable successful data transmission over the voice channel, wireless modem 40 applies some type of encoding or modulation to convert the digital data so that it can communicate through a vocoder or speech codec incorporated in the cellular chipset/component 38. It is to be understood that any suitable encoding or modulation technique that provides an acceptable data rate and bit error may be used with the examples disclosed herein.

The cellular chipset/component 38 of the infotainment unit 28 may be an analog, digital, dual-mode, dual-band, multi-mode and/or multi-band cellular phone. The cellular chipset-component 38 uses one or more prescribed frequencies in standard analog and/or digital bands in the current market for cellular systems. Any suitable protocol may be used, including digital transmission technologies, such as TDMA (time division multiple access), CDMA (code division multiple access), and FDMA (frequency-division multiple access).

The in-vehicle infotainment unit 28 may also be configured for short range wireless communication technologies, such as BLUETOOTH®, dedicated short-range communications (DSRC), or Wi-Fi™. In these instances, the cellular chipset/component 38 may operate in conjunction with a short range wireless communication unit 42 of the infotainment unit 28. As described above, short range wireless communications may be suitable for communication between, for example, the infotainment unit 28 and the mobile communications device 30. In an example, an application on the mobile communications device 30 may be capable of receiving a user input that prompts a command to be sent from the mobile communications device 30 to the vehicle 12 to unlock the vehicle 12. The use of short-range wireless communication technologies will depend, at least in part, on the distance of the vehicle 12 from the mobile communications device 30. For example, when the short range wireless communication unit 42 is configured for BLUETOOTH® connections, the short-range wireless communication unit 42 may have a preset wireless access range, or may have a standard range of about 10 meters (i.e., about 32 feet).

In the example shown in FIG. 1, the in-vehicle infotainment unit 28 is an on-board vehicle dedicated communications and entertainment device. In another example (not shown), the in-vehicle infotainment unit 28 is an on-board vehicle dedicated entertainment device that is in operative communication with a separate on-board vehicle dedicated communications device (e.g., a telematics unit). Whether integrated into a single unit (e.g., infotainment unit 28) or included as separate units, the on-board vehicle dedicated communications and entertainment device(s) include hardware components that are capable of running computer readable instructions/code, which are embodied on non-transitory, tangible computer readable media.

The in-vehicle infotainment unit 28 may provide a variety of services, both individually and through its communication with either the mobile communications device 30 or the call center 32 (e.g., a facility that may be owned and operated by an in-vehicle infotainment unit service provider). Several examples of these services include, but are not limited to: turn-by-turn directions and other navigation-related services provided in conjunction with a location detection based chipset/component 44; airbag deployment notification and other emergency or roadside assistance-related services provided in connection with various crash and/or collision sensor interface modules 46 and sensors 48 located throughout the vehicle 12; and infotainment-related services where music, Web pages, movies, television programs, videogames and/or other content is downloaded by the infotainment unit 28 via a vehicle bus system 50 and an audio bus system 52. The listed services are by no means an exhaustive list of all the capabilities of the infotainment unit 28, but are simply an illustration of some of the services that the in-vehicle infotainment unit 28 is capable of offering.

The infotainment unit 28 generally includes an electronic processing device 54 operatively coupled to one or more types of electronic memory 56, which has the in-vehicle application 58 resident thereon. In an example, the electronic processing device 54 is a micro-processor. In other examples, the electronic processing device 54 may be a micro controller, a controller, a host processor, and/or a vehicle communications processor. In another example, electronic processing device 54 may be an application specific integrated circuit (ASIC). Alternatively, electronic processing device 54 may be a processor working in conjunction with a central processing unit (CPU) performing the function of a general-purpose processor.

The electronic memory 56 of the infotainment unit 28 may be an encrypted memory that is configured to store computer readable instructions/code to be executed by the processor 54, data associated with the various systems of the vehicle 12 (i.e., vehicle data), vehicle operations, vehicle user preferences and/or personal information, and the like. In an example, the electronic memory 56 stores computer readable instructions for controlling the powertrain control module 68 in response to the commands received from the call center server 36. For example, the electronic processing device 54 running the computer readable instructions may send a signal triggering the powertrain control module 68 to enter the disengaged state in response to receiving the ignition block command from the call center server 36. For another example, the electronic processing device 54 running the computer readable instructions may send a signal triggering the powertrain control module 68 to enter the engaged state in response to receiving the ignition enabling command from the call center server 36.

As another example, the electronic memory 56 may also store the unique identifying code that can be used to establish a short range wireless connection with the mobile communications device 30.

The previously mentioned in-vehicle application 58 may be downloaded (e.g., from an online application store or marketplace) and stored on the electronic memory 56. The in-vehicle application 58 may enable the user to input and save payment information (e.g., credit card name, number, expiration, security code, etc.) that will subsequently be used to pay for the vehicle services. At least some of the computer readable instructions of the in-vehicle application 58 provide an interface for the user to communicate with the call center server 36 through the infotainment unit 28. More specifically, the in-vehicle application 58 may include computer readable code/instructions for receiving a service payment request from the call center server 36, for displaying the service payment request on an in-vehicle display 60, for receiving user input in response to the displayed service payment request, and for transmitting a notification of payment acceptance or denial to the call center server 36.

As mentioned above, the infotainment unit 28 may also include the location detection chipset/component 44, which may include a GPS receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection chipset/component may also include, for example, Glonass (i.e., global navigation satellite system), Sbas (i.e., satellite-based augmentation systems), or a D-GPS (differential global positioning system). The location detection chipset/component 44 may or may not be part of a navigation unit.

While not shown, it is to be understood that the in-vehicle infotainment unit 28 may also include a real-time clock (RTC), a short-range wireless antenna, and/or a dual mode antenna. The real-time clock (RTC) provides accurate date and time information to the in-vehicle infotainment unit 28 hardware and software components that may require and/or request date and time information. In an example, the RTC may provide date and time information periodically, such as, for example, every ten milliseconds. Generally, the short-range wireless antenna services the short-range wireless communication unit 42 and the dual mode antenna services the location detection chipset/component 44 and the cellular chipset/component 38. It is to be understood that the in-vehicle infotainment unit 28 may be implemented without one or more of the above listed components (e.g., the real-time clock). It is to be further understood that in-vehicle infotainment unit 28 may also include additional components and functionality as desired for a particular end use.

The infotainment unit 28 is also operatively connected to the vehicle bus system 50. The vehicle bus system 50 may utilize a variety of networking protocols, such as a controller area network (CAN), a media oriented system transfer (MOST), a local interconnection network (LIN), an Ethernet or TCP/IP, and other appropriate connections such as those that conform with known ISO, SAE, and IEEE standards and specifications, to name a few. The vehicle bus system 50 enables the vehicle 12 to send signals (i.e., real-time bus messages) from the infotainment unit 28 to various units of equipment and systems both outside the vehicle 12 and within the vehicle 12 to perform or initiate various functions, such as switching the powertrain control module 68 between the engaged and disengaged states, unlocking a door, executing personal comfort settings, and/or the like. The vehicle bus system 50 also enables the vehicle 12 to receive signals at the infotainment unit 28 from various units of equipment and systems both outside the vehicle 12 and within the vehicle 12.

The infotainment unit 28 may also include an audio component that receives analog information, rendering it as sound, via the audio bus system 52. Digital information may be received at the infotainment unit 28 via the vehicle bus system 50. The audio component may provide AM and FM radio, high-definition radio, satellite radio, CD, DVD, multimedia, and other like functionality, in conjunction with the controller/processor 54 of the infotainment unit 28. The infotainment unit 28 may contain a speaker system, or may utilize vehicle speaker 62 via arbitration on vehicle bus system 50 and/or audio bus system 52.

As mentioned above, the vehicle 12 also includes the display 60. The display 60 may be operatively directly connected to or in communication with the infotainment unit 28. In an example, the display 60 may be used to display messages from the call center server 36 to the in-vehicle occupant(s). Examples of the display 60 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like. In an example, the display 60 is a full-color touch screen display.

As illustrated in FIG. 1, the vehicle 12 may also include other vehicle systems that are connected to the vehicle bus system 50. Examples of these other vehicle systems may include the crash and or collision sensors 48 and other vehicle sensors 66. The crash sensors 48 provide information to the infotainment unit 28 via the crash and/or collision detection sensor interface 46 regarding the severity of a vehicle collision, such as the angle of impact and the amount of force sustained. The other vehicle sensors 66, connected to various sensor interface modules 64, are also operatively connected to the vehicle bus system 50. Examples of the other vehicle sensors 66 include, but are not limited to, key detecting sensors, gyroscopes, accelerometers, magnetometers, emission detection and/or control sensors, lane departure sensors (e.g., video sensors, laser sensors, infrared sensors, etc.), speed sensors, following distance sensors (e.g., radar sensors, video sensors, infrared sensors, ultrasonic sensors, etc.), braking activity sensors, environmental detection sensors, and/or the like. Examples of the sensor interface modules 64 include the powertrain control module 68, climate control, body control, and/or the like.

The powertrain control module 68 is operatively connected to at least the vehicle bus system 50 and to one or more vehicle drive wheels 70. The powertrain control module 68 is switchable between the engaged state and the disengaged state. In the engaged state, the powertrain control module 68 is electrically enabled to provide tractive power to the vehicle drive wheel(s) 70. In the disengaged state, the powertrain control module 68 is electrically inhibited from providing tractive power to one or more vehicle drive wheels 70.

Figure 2:
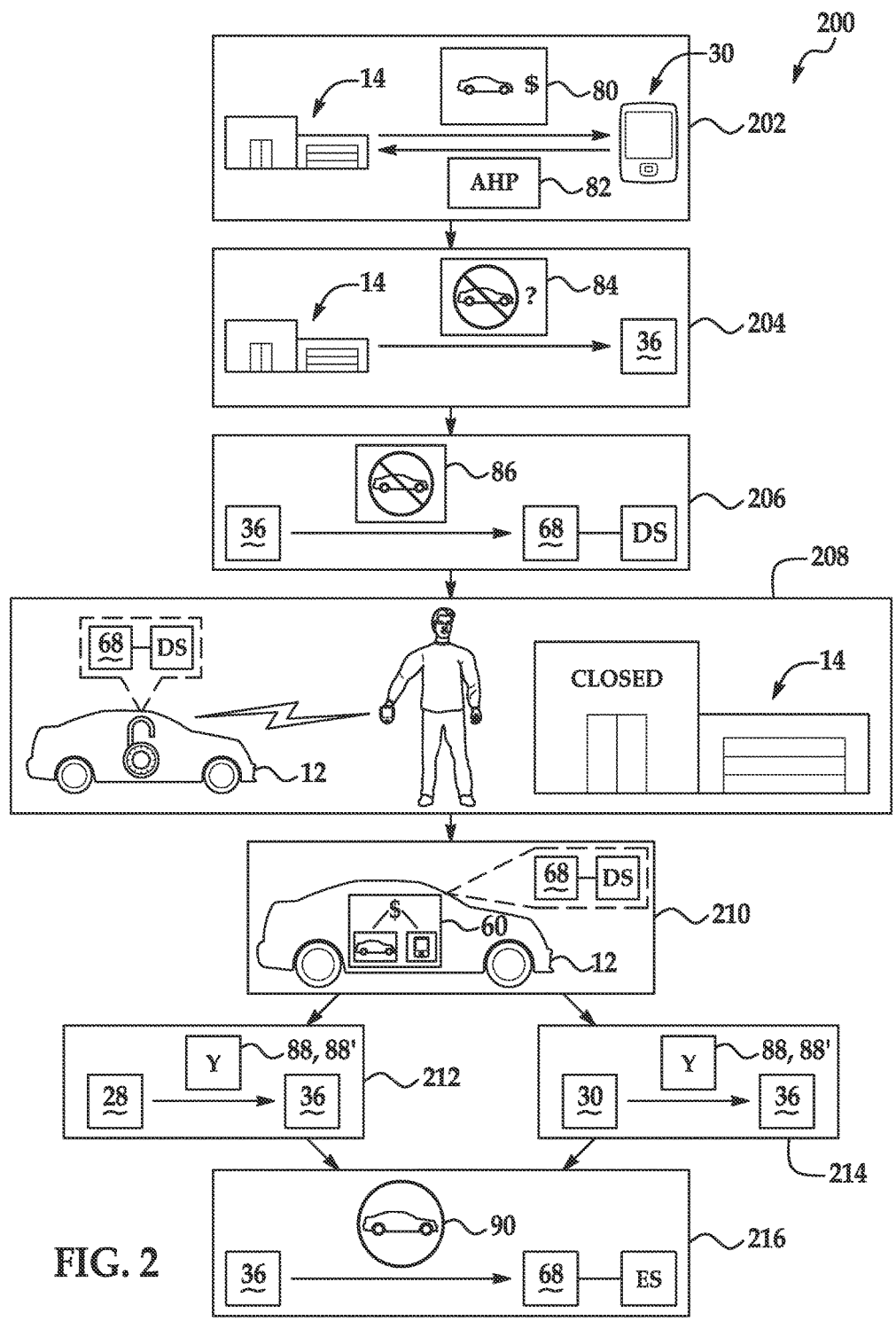
FIG. 2 is a schematic flow diagram illustrating examples of a method for enabling after-hours vehicle pick up.

As mentioned above, the system 10 shown in FIG. 1 enables a user to pick up his/her vehicle 12 outside of the normal operating hours of the establishment 14 after it has been serviced by the establishment 14. As will be illustrated throughout the discussion of FIG. 2, the ignition block that is utilized prohibits the vehicle 12 from being driven until payment for the services has been authorized or received. An example of the method 200 for enabling the after-hours vehicle pick up is shown in FIG. 2 and will now be described.

In this example of the method, the vehicle 12 has been dropped off at the establishment 14 (e.g., dealership) for some service(s), and the service(s) has/have been rendered. The vehicle 12 is likely parked in a lot of the establishment 14, where it is accessible to the user after hours.

Upon recognizing that the service(s) has/have been completed in a manner previously described, the establishment server 17 transmits the service completion notice 80 to the mobile communications device 30 (represented at reference numeral 202). In an example, this service completion notice 80 includes a notification indicating that the vehicle 12 is ready for pick up, how much money is owed for the service(s), and that a vehicle pick up date and time should be scheduled. For example, the service completion notice may be a text message stating, "Hello Ms. X, your vehicle is ready for pick up and you owe $150.00 for the service(s) rendered. Please reply with a date and time for vehicle pick up". Alternatively, the message may include an inquiry about scheduling the pick up date and time, such as "Would you like to schedule a date and time for vehicle pick up? If yes, press '1', if no press '2'".

The service completion notice 80 may be displayed on the mobile communications device 30 of the user. The user may utilize the key pad or touch screen of the mobile communications device 30 in order to respond with a reply message 82 that includes a desired date and time for picking up the vehicle 12 (represented at reference numeral 202). In the example shown in FIG. 2, the reply message 82 transmitted from the mobile communications device 30 (e.g., through the application 37 and the wireless communications module 35) is labeled "APH" because the date and time input by the user are outside of the normal operating hours of the establishment. This reply message 82 is received by the establishment server 17.

In one example of the method, the establishment server 17 compares the date and time in the reply message 82 with the normal operating hours of the establishment 14. This comparison allows the establishment server 17 to confirm the scheduled after-hours vehicle pick up. In response, the establishment server 17 transmits the ignition block request 84 to the call center server 36, as shown at reference numeral 204.

The ignition block request 84 indicates to the call center server 36 that a service payment is due by the vehicle user and requests that an ignition block be initiated in the vehicle 12. The ignition block request 84 may identify the vehicle 12 using the VIN, and the call center server 36 may look up the vehicle's mobile dialing number (e.g., in database 41) using the VIN. Examples of the mobile dialing number include an international mobile subscriber identify (IMSI) or a mobile equipment identifier (MEID).

At the same time that the ignition block request 84 is transmitted to the call center server 36, the establishment server 17 can transmit a service payment request to the vehicle 12. When displayed within the vehicle 12, the service payment request can inform the user that the vehicle 12 is in a disengaged state DS, and can request that a payment be made for the outstanding balance for the service(s) rendered by the establishment 14. The service payment request can be received by the vehicle bus 50 and transmitted to the application 58 for storage until the infotainment unit 28 is activated (e.g., by a vehicle unlock event). When the infotainment unit 28 is subsequently activated, the application 58 will cause the service payment request to be displayed, allowing input of payment on the display 60 or on the mobile communications device 30 (as discussed below).

The call center server 36 then generates and transmits (e.g., using the communication module 45) the ignition block command 86 to the serviced vehicle 12 (reference numeral 206). The ignition block command 86 is received by the vehicle bus 50 and is transmitted to the electronic processing device 54 for processing. The electronic processing device 54 recognizes the ignition block command 86, and in response sends a signal that triggers the powertrain control module 68 to enter the disengaged state DS. In the disengaged state DS, the powertrain control module 68 is electrically prohibited from providing tractive power to a vehicle drive wheel 70. At this point in this example of the method 200, the vehicle 12 is parked in the lot of the establishment 14 and is not drivable due to the disengaged state DS.

As shown at reference numeral 208, the user (i.e., the vehicle owner or another authorized vehicle driver) arrives at the establishment 14 at the scheduled after-hours time. As illustrated, the vehicle 12 may be unlocked using a key fob, a mechanical key, or the mobile communications device 30 (e.g., utilizing an unlock application that transmits an unlock signal directly to the vehicle 12 or through the call center server 58). It is to be understood that even though the vehicle 12 can be unlocked, the powertrain control module 68 remains in the disengaged state and thus the vehicle 12 remains inoperable.

The vehicle unlock event triggers the activation of the infotainment unit 28 and the application 58. Upon being activated, the application 58 will recognize that the service payment request has been received and is to be displayed on the in-vehicle display 60. The service payment request will be displayed on the in-vehicle display 60. As noted above, the service payment request may indicate to the user that he/she can transmit the payment or authorization for the payment using the infotainment unit 28 and/or to the mobile communications device 30 (reference numeral 210). In reference numeral 210, the infotainment unit 28, the in-vehicle application 58 and display 60 are initiated (e.g., woken up from a sleep mode) in response to the unlock event. The service payment request is then displayed on the in-vehicle display 60. As illustrated, the payment service request shown on the display 60 informs the user that he/she can transmit the payment or authorization for the payment using the infotainment unit 28 and/or to the mobile communications device 30. During step 210, the powertrain control module 68 remains in the disengaged state and thus the vehicle 12 remains inoperable.

The service payment request essentially asks that a payment be made for the outstanding balance for the service(s) rendered by the establishment 14. If the user chooses not to make a payment (e.g., by declining to authorize a payment, or by not responding to the service payment request), the powertrain control module 68 remains in the disengaged state and thus the vehicle 12 remains inoperable.

The user can choose to make or authorize a payment using the in-vehicle application 58 (shown at reference numeral 212) or using the mobile device application 37 (shown at reference numeral 214). The payment acceptance is generally shown at reference numeral 88 in each of the boxes 212, 214.

In one example, the user will select to make a payment through the application 58 or 37. In this example, the application 58 or 37 will prompt the user to input credit card information. Once the user inputs the information using the in-vehicle display 60 or mobile communications device 30, the credit card information will be securely transmitted (e.g., as packet data) directly to the establishment server 17 for subsequent processing. The establishment server 17 is capable of immediately processing the payment and informing the application 58 or 37 (and the user) that the payment has been accepted or denied. When the application 58 or 37 receives acknowledgment that payment has been accepted, a separate notification of the payment acceptance 88 is also transmitted from the application 58 or 37 to the call center server 36, so that that the server 36 knows that the outstanding balance has been taken care of and that the vehicle 12 can be enabled. This separate payment acceptance notification 88 will not be sent if the application 58 or 37 receives acknowledgment that payment has been denied.

In another example, the user will select to authorize a payment through the application 58 or 37 using credit card information previously stored in the memory 56 or 33. In this example, the application 58 or 37 will retrieve the credit card information from the memory 56 or 33 and will securely transmit (e.g., as packet data) the credit card information directly to the establishment server 17 for subsequent processing. The establishment server 17 is capable of immediately processing the payment and informing the application 58 or 37 (and the user) that the payment has been accepted or denied. When the application 58 or 37 receives acknowledgment that payment has been accepted, a separate notification of the payment acceptance 88 is also transmitted from the application 58 or 37 to the call center server 36, so that that the server 36 knows that the outstanding balance has been taken care of and that the vehicle 12 can be enabled. This separate payment acceptance notification 88 will not be sent if the application 58 or 37 receives acknowledgment that payment has been denied.

In still another example, the user will select to authorize a payment through the application 58 or 37 using credit card information on file for the vehicle owner at the call center 32 (e.g., in his/her profile stored in the database 31). In this example, the application 58 or 37 will transmit the payment authorization 88', which in this example includes permission to utilize the on-file credit card information, to the call center server 36. A payment notification, including the on-file credit card information, is then sent from the call center server 36 to the establishment server 17 for processing. The establishment server 17 is capable of immediately processing the payment and informing the call center server 36 (via a message) that the payment has been accepted or denied. Upon receiving the message from the establishment server 17, the call center server 36 can transmit a message to the application 58 or 37 (and the user) indicating that the payment has been accepted or denied.

In any of the examples disclosed herein, if the payment is denied, the powertrain control module 68 remains in the disengaged state and thus the vehicle 12 remains inoperable.

Steps 212 and/or 214 illustrate the notification of the payment acceptance 88 or payment authorization 88' being sent to the call center server 36. In response to receiving the notification 88, the call center server 36 generates and transmits (e.g., using the communication module 45) the ignition enabling command 90 to the vehicle bus 50. In response to receiving the authorization 88', the call center server 36 transmits the payment information to the establishment server 17 for processing and awaits notification that payment has been accepted. Upon receiving notification that the payment has been accepted, the call center server 36 generates and transmits (e.g., using the communication module 45) the ignition enabling command 90 to the vehicle bus 50. The ignition enabling command 90 is transmitted from the vehicle bus 50 to the electronic processing device 54 for processing. The electronic processing device 54 recognizes the ignition enabling command 90, and in response sends a signal that triggers the powertrain control module 68 to enter the engaged state ES, as shown at reference numeral 216. In the engaged state ES, the powertrain control module 68 is electrically enabled to provide tractive power to a vehicle drive wheel 70. At this point in this example of the method 200, the vehicle 12 is drivable and the user can complete the after-hours vehicle pick up.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for enabling after-hours vehicle pick up, the method comprising:
   receiving, at a server, an ignition block request indicating that a service payment request is outstanding for a serviced vehicle, the ignition block request transmitted from a dealership server upon determination by the dealership server that a customer pick up request is outside of operating hours of a dealership;
   in response to the receiving the ignition block request from the dealership server, identifying the serviced vehicle based upon a vehicle identification included in the ignition block request;
   in response to identifying the serviced vehicle, transmitting, from the server, an ignition block command to the serviced vehicle, the ignition block command triggering a powertrain control module of the serviced vehicle to enter a disengaged state that electrically prohibits the powertrain control module from providing tractive power to a vehicle drive wheel;
   in response to detection of an unlock request, causing display of the service payment request at an in-vehicle display, wherein the powertrain control module remains in the disengaged state during unlocking and the displaying;
   receiving, at the server, notification of a payment acceptance from an infotainment unit of the serviced vehicle or a mobile communications device associated with the serviced vehicle; and
   in response to receiving the notification, transmitting, from the server, an ignition enabling command triggering the powertrain control module to enter an engaged state that electrically enables the powertrain control module to provide tractive power to the vehicle drive wheel.

2. The method as defined in claim 1, further comprising transmitting the service payment request from the dealership server to the infotainment unit.

3. The method as defined in claim 2 wherein prior to the server receiving the notification of the payment acceptance, the method further comprises:
   unlocking the serviced vehicle in response to the unlock request.

4. The method as defined in claim 3, further comprising transmitting the payment acceptance to the server through an in-vehicle application resident on a memory of the infotainment unit.

5. The method as defined in claim 3, further comprising transmitting the payment acceptance to the server using an application resident on a memory of the mobile communications device.

6. The method as defined in claim 1, further comprising:
   receiving the ignition block command at the serviced vehicle; and in response to receiving the ignition block command, entering, by the powertrain control module, the disengaged state.

7. The method as defined in claim 6, wherein the powertrain control module remains in the disengaged state until the ignition enabling command is received.

8. A method for picking up a serviced vehicle after hours, the method comprising:
   entering, at a powertrain control module of the serviced vehicle, a disengaged state in response to receiving an ignition block command from a server, the disengaged state electrically prohibiting the powertrain control module from providing tractive power to a vehicle drive wheel of the serviced vehicle, the server configured to provide the ignition block command in response to identifying the serviced vehicle based upon a vehicle identification included in an ignition block request, the ignition block request transmitted by a dealership server upon determination by the dealership server that a customer pick up request is outside of operating hours of a dealership;
   while the powertrain control module is in the disengaged state, unlocking the vehicle in response to an unlock request;
   while the powertrain control module is in the disengaged state and in response to detection of the unlock request, displaying a service payment request on a display of an in-vehicle infotainment unit;
   transmitting a payment acceptance notification in response to the service payment request;
   receiving an ignition enabling command at the serviced vehicle; and
   in response to the ignition enabling command, entering an engaged state by the powertrain control module, the engaged state electrically enabling the powertrain control module to provide tractive power to the vehicle drive wheel.

9. The method as defined in claim 8, further comprising:
   in response to the service payment request, receiving a user payment input via an in-vehicle application resident on a memory of the in-vehicle infotainment unit;
   wherein the transmitting of the payment acceptance notification includes transmitting the payment acceptance notification via the in-vehicle application.

10. The method as defined in claim 8, further comprising:
    in response to the service payment request, receiving a user payment input via a mobile communications device application resident on a memory of mobile communications device associated with the serviced vehicle;
    wherein the transmitting of the payment acceptance notification includes transmitting the payment acceptance notification via the mobile communications device application.

11. A system for enabling after-hours vehicle pick up of a serviced vehicle, comprising:
    a vehicle bus system disposed in a vehicle;
    a powertrain control module connected to the vehicle bus system, the powertrain control module configured to:
       selectively enter an engaged state electrically enabling the powertrain control module to provide tractive power to a vehicle drive wheel; and
       selectively enter a disengaged state electrically inhibiting the powertrain control module from providing tractive power to the vehicle drive wheel; and
    an in-vehicle microprocessor connected to the vehicle bus system, the in-vehicle microprocessor configured to execute computer readable instructions, embodied on a non-transitory computer readable medium, to cause the in-vehicle microprocessor to:
       trigger the powertrain control module to enter the disengaged state in response to receiving an ignition block command from a server, the server configured to provide the ignition block command in response to identifying the serviced vehicle based upon a vehicle identification included in an ignition block request, the ignition block request transmitted by a dealership server upon determination by the dealership server that a customer pick up request is outside of operating hours of a dealership;
       in response to detection of an unlock request, display a service payment request at an in-vehicle display, wherein the powertrain control module remains in the disengaged state during unlocking and the displaying; and
       trigger the powertrain control module to switch from the disengaged state to the engaged state in response to a received ignition enabling command that is transmitted only after a payment acceptance notification is received in response to receipt of the service payment at the server.

12. The system as defined in claim 11, further comprising:
    the dealership server configured to execute computer readable instructions embodied on a non-transitory computer readable medium to cause a processor of the dealership server to:
    generate a service completion notice;
    generate the service payment request; and
    generate an ignition block request in response to receiving confirmation of an after-hours vehicle pick up, the ignition block request including the vehicle identification; and
    a dealership communications module operatively connected to the dealership server configured to transmit the service completion notice, the service payment request, and the ignition block request.

13. The system as defined in claim 11, further comprising:
    a memory associated with the in-vehicle microprocessor; and
    an application resident on the memory, the application including computer readable instructions that, when executed by the in-vehicle microprocessor cause the in-vehicle microprocessor to:
       receive a user payment input in response to the service payment request; and
       transmit a payment acceptance notification in response to the user payment input.

14. The system as defined in claim 11, further comprising:
    a mobile communications device associated with the serviced vehicle, the mobile communications device including a processor and a memory; and
    an application resident on the memory, the application including computer readable instructions that, when executed by the processor, cause the processor to:
       receive a user payment input in response to the service payment request; and
       transmit the payment acceptance notification in response to the user input.

* * * * *